(12) United States Patent
Nawa et al.

(10) Patent No.: US 7,541,769 B2
(45) Date of Patent: Jun. 2, 2009

(54) ELECTRIC POWER CONVERTER AND MOTOR DRIVING SYSTEM

(75) Inventors: Masamichi Nawa, Mito (JP); Takefumi Sawada, Ishioka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/654,675

(22) Filed: Jan. 18, 2007

(65) Prior Publication Data

US 2007/0176575 A1 Aug. 2, 2007

(30) Foreign Application Priority Data

Jan. 30, 2006 (JP) ............................. 2006-020643

(51) Int. Cl.
*H02P 27/04* (2006.01)
(52) U.S. Cl. ...................... 318/800; 318/801; 318/809; 318/812; 318/632
(58) Field of Classification Search ................. 318/432, 318/433, 445, 452, 456, 632, 801, 811, 812, 318/800, 808, 809
See application file for complete search history.

(56) References Cited

U.S. PATENT DOCUMENTS

| | | | | | |
|---|---|---|---|---|---|
| 5,811,949 | A | * | 9/1998 | Garces | ........................ 318/448 |
| 5,850,132 | A | * | 12/1998 | Garces | ........................ 318/599 |
| 5,872,710 | A | * | 2/1999 | Kameyama | ................... 363/95 |
| 5,977,741 | A | * | 11/1999 | DeLange et al. | ............ 318/801 |
| 6,714,424 | B2 | * | 3/2004 | Deng et al. | ..................... 363/17 |
| 6,847,532 | B2 | * | 1/2005 | Villaret | ........................ 363/132 |
| 6,914,399 | B2 | * | 7/2005 | Kushion et al. | ............. 318/434 |
| 7,126,304 | B2 | * | 10/2006 | Suzuki | ................... 318/400.04 |
| 2004/0037097 | A1 | | 2/2004 | Deng et al. | |
| 2006/0006834 | A1 | * | 1/2006 | Suzuki | ........................ 318/801 |
| 2006/0113937 | A1 | * | 6/2006 | Hidaka et al. | ................ 318/432 |

FOREIGN PATENT DOCUMENTS

| | | |
|---|---|---|
| JP | 5-64457 A | 3/1993 |
| JP | 9-47064 A | 2/1997 |
| JP | 9-84385 A | 3/1997 |
| JP | 2002-218794 A | 8/2002 |
| JP | 2003-189634 A | 7/2003 |

OTHER PUBLICATIONS

European Search Report dated Apr. 5, 2007 (Six (6) pages).
Chinese office action dated Jun. 27, 2008 in English.

* cited by examiner

*Primary Examiner*—Lincoln Donovan
*Assistant Examiner*—Thai Dinh
(74) *Attorney, Agent, or Firm*—Crowell & Moring LLP

(57) ABSTRACT

An electric power converter which has improved accuracy in compensation of a dead time. A motor driving system employing the electric power converter is also provided. A power module includes a plurality of switching devices connected in series and converts DC power to AC power. A control circuit produces a voltage command value in accordance with a control command inputted from the exterior, and produces gate signals to drive the switching devices of the power module corresponding to a final voltage command value which is obtained from the voltage command value with dead time compensation. A dead time compensation logic circuit calculates a final dead time compensation voltage based on a change rate of the voltage command value, a gain (dead time compensation voltage value), and a polarity of a current, the gain being calculated from a DC voltage value supplied to the electric power converter, a dead time, and a switching frequency.

7 Claims, 5 Drawing Sheets

ELECTRIC POWER CONVERTER AND MOTOR DRIVING SYSTEM

BACKGROUND OF THE INVENTION

1. Field of the Invention

The present invention relates to an electric power converter for converting DC power to AC power and in a motor driving system employing the electric power converter. More particularly, the present invention relates to an electric power converter suitable for compensating a dead time set in a drive signal for driving a semiconductor switching device, and to a motor driving system employing the electric power converter.

2. Description of the Related Art

An electric power converter, such as an inverter, is used to convert a DC voltage to an AC voltage by switching upper and lower switching devices, which are connected in series, with pulse width modulation (PWM), for example, and to drive an AC electric motor. If the upper and lower switching devices are turned on at the same time, an overcurrent flows with short-circuiting between the upper and lower switching devices, thus resulting in damages of those switching devices. To avoid such a trouble, therefore, a short-circuiting preventive time (dead time) is generally provided to a gate signal for driving each switching device.

With the provision of the dead time, however, a final output voltage is made ineffective in amount corresponding to the dead time. The ineffective voltage has a polarity opposed to that of a current and causes a drop of the output voltage of an inverter. The drop of the output voltage causes a ripple in the motor current in a low speed range, and the current ripple generates a torque variation.

As the related art for overcoming the above-mentioned problem, JP-A-5-64457 (Patent Document 1), for example, discloses a method of setting a compensation voltage value ($\Delta V$), which corresponds to a certain ineffective voltage value, depending on the polarity of a voltage command ($V^*$), and adding the compensation voltage value ($\Delta V$) to the voltage command ($V^*$) to provide a final voltage command value. Thus, by compensating the voltage in advance, a required average voltage is ensured with no delay.

Also, JP-A-2002-218794 (Patent Document 2), for example, discloses a method of estimating a motor resistance value (R) from both a moving average value of a voltage command ($V^*$) and a current command ($I^*$), multiplying the estimated motor resistance value (R) by the current command ($I^*$) to obtain a compensation voltage value ($\Delta V$), and adding the compensation voltage value ($\Delta V$) to the voltage command ($V^*$) to provide a final voltage command value.

SUMMARY OF THE INVENTION

However, the method disclosed in JP-A-5-64457 has the problems as follows. The influence of the dead time depends on the amplitude of the output voltage such that it is small at a peak of the voltage peak and is large at rising and falling of the voltage. Since a constant voltage is always added in spite of such a property, a compensation error is large. Further, in a high-speed rotation range of an AC electric motor, i.e., in a range where the power factor is other than 1, a phase difference occurs between the output voltage and current, and the polarity of the dead time is opposed to that of the current. Nevertheless, such a point is not compensated and hence the compensation error is increased.

Also, the method disclosed in JP-A-2002-218794 has the problems as follows. When the process of estimating the resistance from the voltage command and multiplying the estimated resistance by the motor current is executed in a short control cycle (e.g., 100 µs), a load factor of CPU is increased. Further, components of impedance of the motor are changed depending on a motor rotation speed. For example, in a low-speed rotation range where the power factor is close to 1, a resistance (R) component is large, and in a high-speed rotation range where the power factor is not close to 1, the influence of a reactance component, etc. is large. If the impedance of the motor is assumed to be the resistance (R), it is difficult to accurately perform the process of estimating the resistance in the high-speed rotation range. Thus, the compensation error is increased.

An object of the present invention is to provide an electric power converter which has improved accuracy in compensation of a dead time, and a motor driving system employing the electric power converter.

To achieve the above object, the present invention provides an electric power converter comprising a power module including a plurality of switching devices connected in series and converting DC power to AC power, and a control unit for producing a voltage command value in accordance with a control command inputted from the exterior, and producing gate signals to drive the switching devices of the power module corresponding to a final voltage command value which is obtained from the voltage command value with dead time compensation. The control unit includes a dead time compensation unit for producing the final voltage command value which takes a maximum value approximately at a phase $\pi/2$ of the voltage command value on both sides thereof and a minimum value approximately at a phase $3\pi/2$ of the voltage command value on both sides thereof.

With those features, the accuracy in compensation of the dead time can be improved.

Thus, according to the present invention, it is possible to perform compensation of the dead time with improved accuracy.

DESCRIPTION OF THE PREFERRED EMBODIMENTS

The construction and operation of an electric power converter according to one embodiment of the present invention will be described below with reference to FIGS. 1 to 6.

First, the construction of a motor driving system using an inverter, which is the electric power converter according to this embodiment, will be described below with reference to FIG. 1. The motor driving system of this embodiment is used in drive control for a synchronous motor (AC electric motor) mounted in, e.g., an electric or hybrid vehicle.

Figure 1:
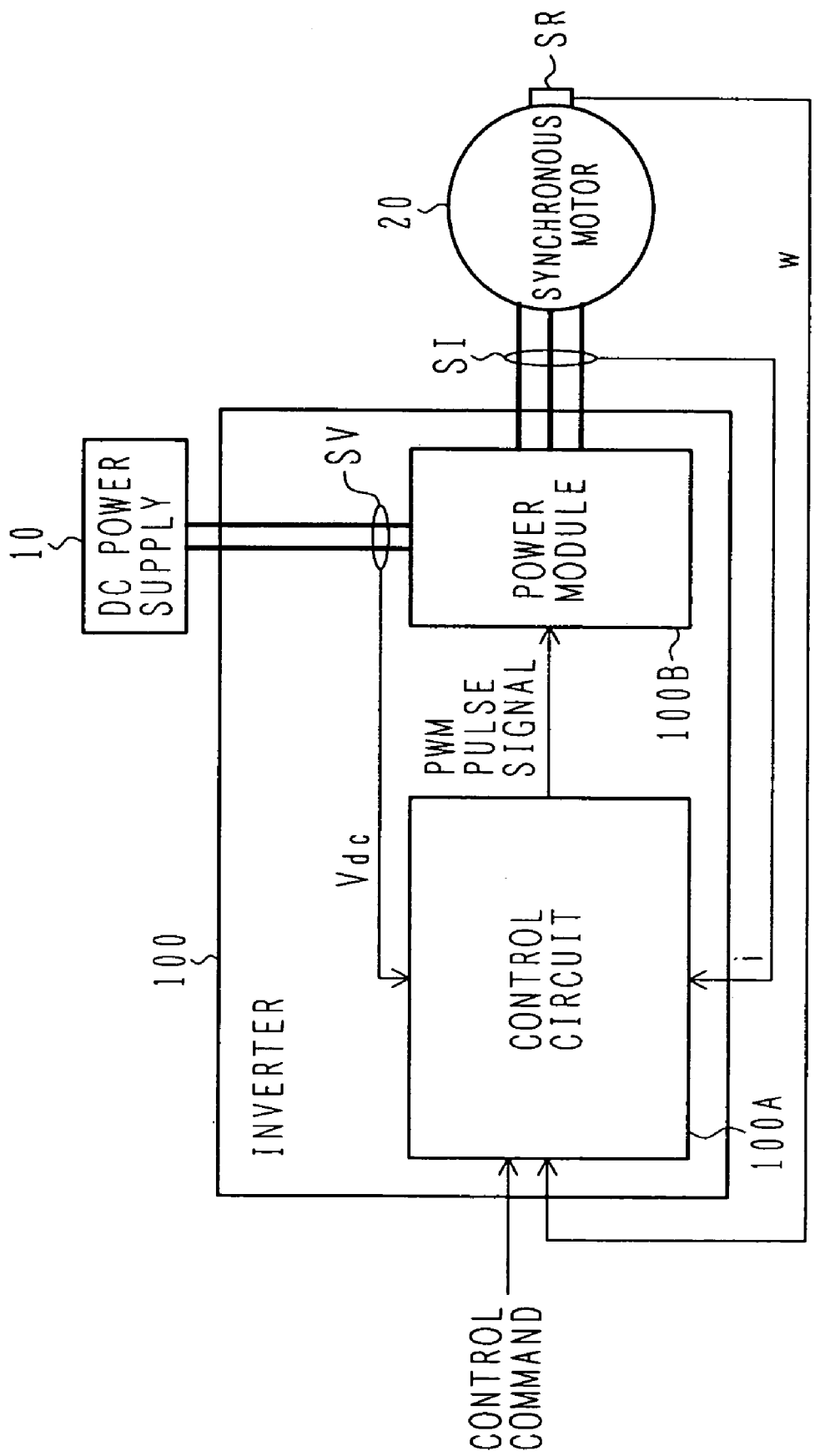
FIG. 1 is a block diagram of a motor driving system using an inverter which is an electric power converter according to one embodiment of the present invention.

FIG. 1 is a block diagram of the motor driving system using the inverter which is the electric power converter according to the one embodiment of the present invention.

An inverter 100 converts DC power outputted from a DC power supply 10 to AC power and supplies the converted AC power to a synchronous motor (AC electric motor) 20, thereby driving the synchronous motor 20. The inverter 100 comprises a control circuit 100A and a power module 100B. The control circuit 100A receives an output voltage Vdc of the DC power supply 10 which is detected by a voltage sensor SV, a motor current i which is supplied to an armature winding of the synchronous motor 20 and is detected by a current sensor SI, and a rotational angle signal ω detected by a rotational angle sensor SR for detecting the pole position of the synchronous motor 20. For example, a resolver is employed as the rotational angle sensor SR. Further, control commands outputted from, e.g., an external controller, are inputted to the control circuit 100A. The control commands include, e.g., a torque command T*, a rotation speed command N*, and a voltage command V*. In accordance with the control commands, the control circuit 100A outputs PWM pulse signals for driving the power module 100B so that the motor current supplied to the synchronous motor 20 is held at a predetermined value.

When DC power is converted to three-phase AC power, the power module 100B includes six semiconductor switching devices. The semiconductor switching devices are each constituted by IGBT or MOS-FET, for example, which is capable of switching a large current. Two semiconductor switching devices are connected in series to constitute a U-phase arm. Other two semiconductor switching devices are connected in series to constitute a V-phase arm. Final two semiconductor switching devices are connected in series to constitute a W-phase arm. The U-, V- and W-arms are connected in parallel. The control circuit 100A outputs the PWM pulse signal inputted to a gate terminal of each of the six semiconductor switching devices. For example, the PWM pulse signals inputted to the gate terminals of the two semiconductor switching devices constituting the U-phase arm are given with a dead time so that those PWM pulse signals are not turned on at the same time.

The PWM pulse signal used in the inverter, which is the electric power converter according to this embodiment, will be described below with reference to FIG. 2. In other words, the following description is made of a PWM signal generation method and the influence of an output voltage drop due to a short-circuiting preventive time (dead time).

Figure 2:
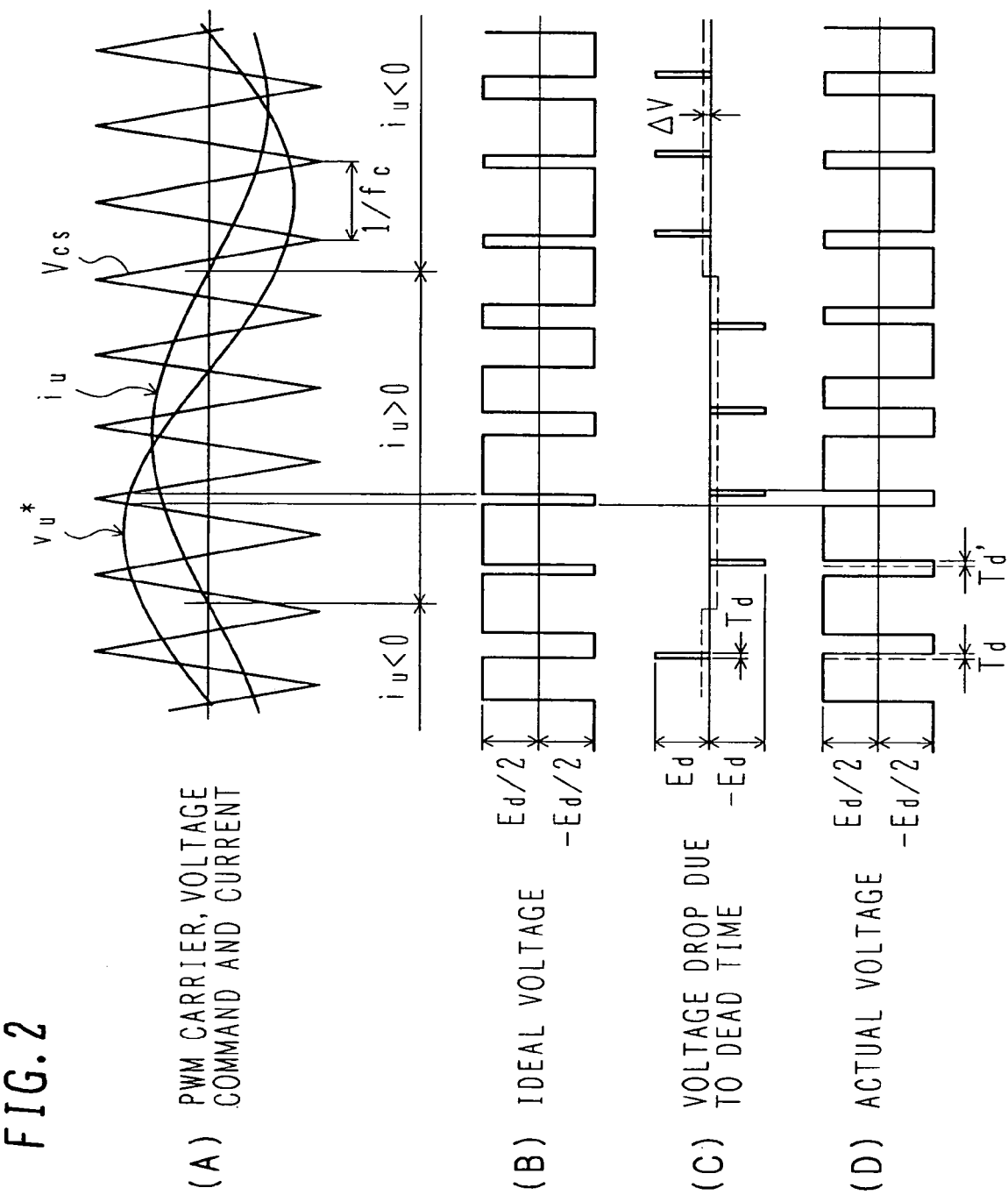
FIG. 2 is charts showing waveforms for explaining a PWM signal used in the inverter which is the electric power converter according to the one embodiment of the present invention.

FIG. 2 shows waveforms for explaining the PWM signal used in the inverter which is the electric power converter according to the one embodiment of the present invention.

In FIG. 2, (A) represents a PWM carrier wave Vcs, a U-phase voltage command Vu*, and a U-phase motor current iu flowing in the synchronous motor 20. (B) represents the voltage waveform of an ideal PWM signal not including the dead time. (C) represents a voltage drop due to the dead time. (D) represents the voltage waveform of an actual PWM signal including the dead time.

The control circuit 100A compares the voltage command Vu* and the PWM carrier wave Vcs shown at (A) in FIG. 2 and produces the PWM signal shown at (D) in FIG. 2. When the voltage command Vu* and the PWM carrier wave Vcs shown at (A) in FIG. 2 are directly compared with each other as they are, the resulting voltage waveform appears as shown at (B) in FIG. 2. However, because a dead time Td shown at (C) in FIG. 2 is given, a PWM waveform including the dead time is actually produced as shown at (D) in FIG. 2. The final output voltage shown at (D) in FIG. 2 becomes ineffective in amount corresponding to the dead time Td. An average value $\Delta V$ of the ineffective voltage due to the dead time is expressed by $\Delta V = Vdc \times Td \times fc$ wherein Vdc is the DC voltage of the DC power supply 10, Td is the short-circuiting preventive time (dead time), and fc is the PWM switching frequency.

The ineffective voltage $\Delta V$ has a polarity opposed to that of the current and causes a drop of the output voltage of the inverter. The drop of the output voltage causes a ripple in the motor current in a low speed range, and the current ripple generates a torque variation.

The detailed configuration of the control circuit 100A in the electric power converter according to this embodiment will be described below with reference to FIG. 3.

Figure 3:
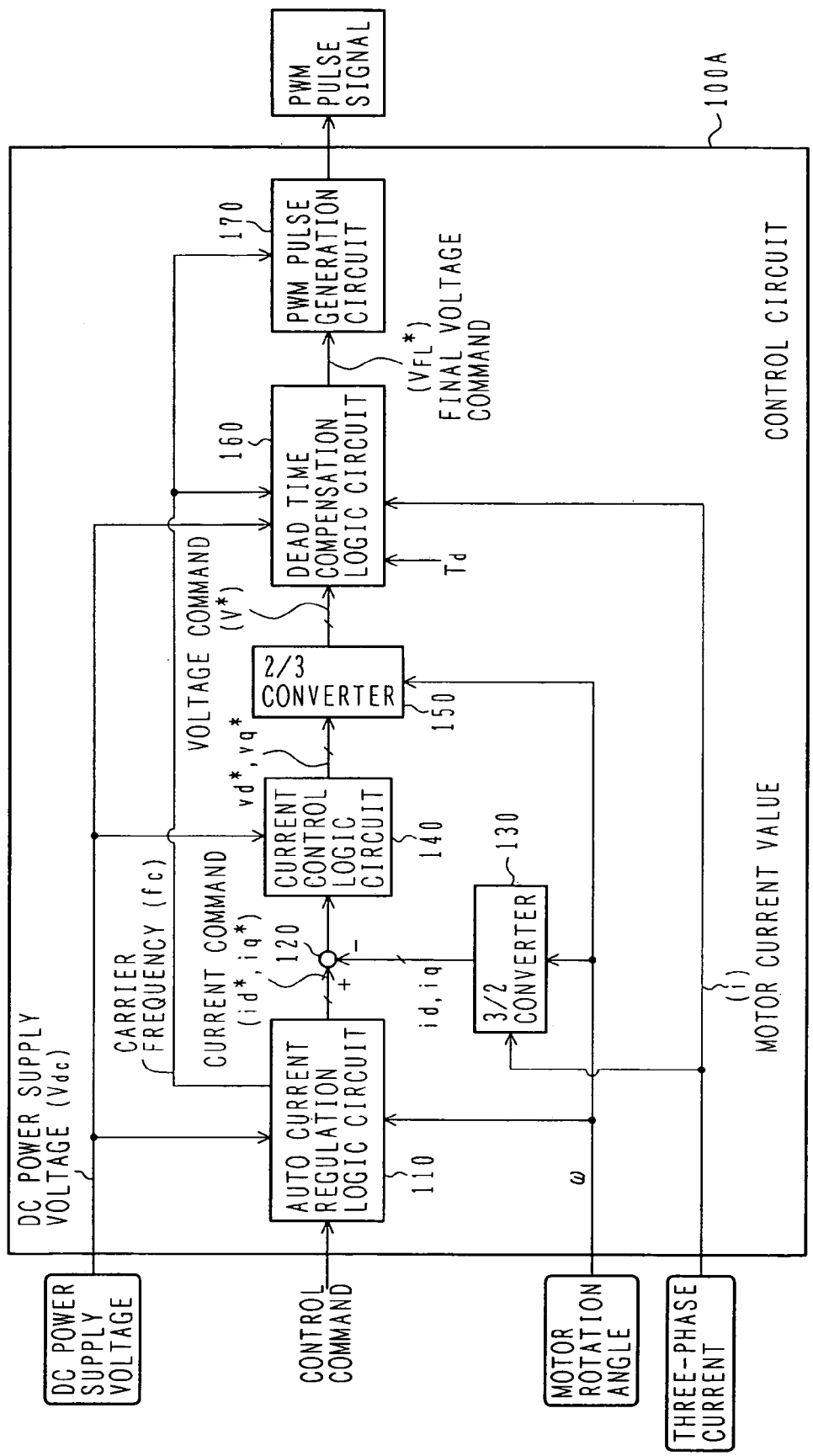
FIG. 3 is a block diagram of a control circuit in the electric power converter according to the one embodiment of the present invention.

FIG. 3 is a block diagram of the control circuit in the electric power converter according to the one embodiment of the present invention. Note that, in FIG. 3, the same characters as those in FIG. 1 denote the same components.

The control circuit 100A comprises an auto current regulation logic circuit 110, a subtracter 120, a 3-to-2 converter 130, a current control logic circuit 140, a 2-to-3 converter 150, a dead time compensation logic circuit 160, and a PWM signal generation circuit 170.

The auto current regulation logic circuit 110 converts the control commands, such as the target torque command T*, the rotation speed command N*, and the target voltage command V*, to current commands id* and iq* based on the power supply voltage Vdc and the rotational angle ω detected by the rotational angle sensor SR.

The 3-to-2 converter 130 converts the three-phase motor current i detected by the current sensor SI to two-phase current values id and iq through vector transformation. The subtracter 120 calculates the respective differences between the current commands id*, iq* and the converted current values id, iq.

The current control logic circuit 140 calculates two-phase voltage commands Vd* and Vq* from the differences, which are obtained by the subtracter 120, in accordance with a control process represented by, e.g., PI control. The calculation in the current control logic circuit 140 can be executed by using desired one of various control processes, such as PI control made on the difference and model PI control based on the motor model.

The 2-to-3 converter 150 converts the two-phase voltage commands Vd* and Vq* to a three-phase voltage command V*. In an inverter not performing the dead time compensation, the voltage command V* is used as the final voltage command. In this embodiment, the dead time compensation logic circuit 160 executes the dead time compensation using the voltage command V* and the other control values to obtain the final voltage command that is sent to the PWM signal generation circuit 170. At that time, the dead time compensation logic circuit 160 executes the dead time compensation based on the voltage command V*, the current value i, the switching frequency fc, the dead time Td, and the DC power-supply voltage value Vdc. Details of the dead time compensation logic circuit 160 will be described below with reference to FIG. 4.

The PWM signal generation circuit 170 produces the PWM pulse signals in accordance with the final voltage command having been subjected to the dead time compensation.

The detailed configuration of the dead time compensation logic circuit 160 in the electric power converter according to this embodiment will be described with reference to FIG. 4.

Figure 4:
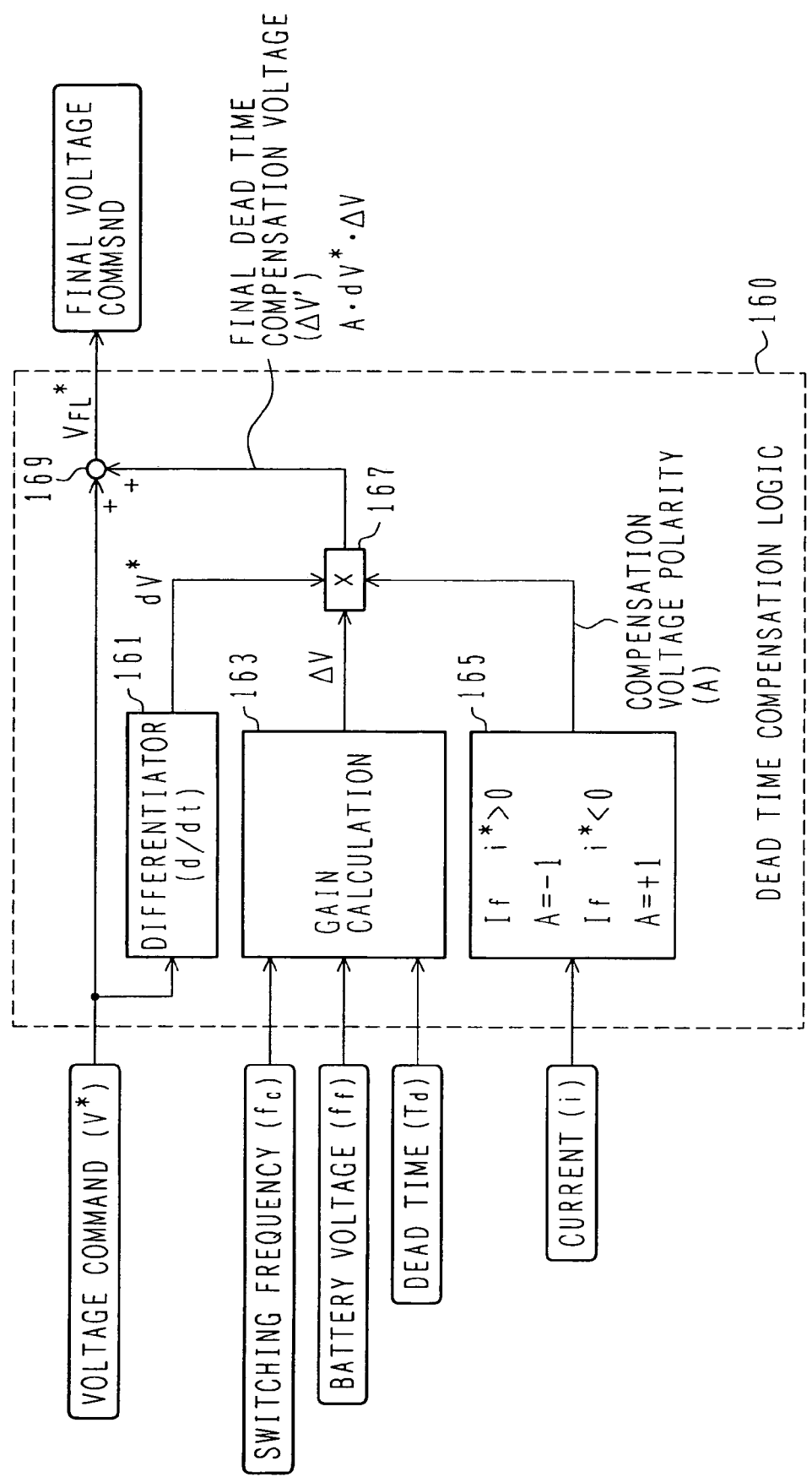
FIG. 4 is a block diagram of a dead time compensation logic circuit in the electric power converter according to the one embodiment of the present invention.

FIG. 4 is a block diagram of the dead time compensation logic circuit in the electric power converter according to the one embodiment of the present invention. Note that, in FIG. 4, the same characters as those in FIGS. 1 and 3 denote the same components.

The dead time compensation logic circuit 160 comprises a differentiator 161, a gain calculator 163, a polarity determination unit 165, a multiplier 167, and an adder 169.

The differentiator 161 differentiates the inputted voltage command V* to calculate a change rate dV* thereof. The gain calculator 163 calculates a dead time compensation voltage (gain) ΔV based on the switching frequency fc, the dead time Td, and the DC power-supply voltage value Vdc. The dead time compensation voltage ΔV is set to ΔV=Vdc×Td×fc in one cycle of the voltage command V*. Herein, the dead time Td is set to, e.g., 2-4 μs in advance. The switching frequency fc is determined depending on the rotation speed. By changing the switching frequency fc to 2-5 kHz at the low rotation speed and 8-15 kHz at the high rotation speed, it is possible to obtain the compensation voltage corresponding to the switching frequency fc and to calculate an accurate gain for the dead time compensation over the entire operating range of the motor. The DC power-supply voltage value Vdc is given as a value having been subjected to filtering in advance, which is represented by a moving average value, for the reason that it is used in PI control, etc. By employing the DC power-supply voltage value Vdc in the gain calculation, the voltage drop caused due to the dead time can be accurately compensated even when the voltage value is increased by, e.g., an induced voltage of the motor, or even when the voltage value is reduced with a high output or deterioration of the DC power supply.

The polarity determination unit 165 sets a polarity A to be −1 when the current i is larger than 0, and to be +1 when the current i is smaller than 0.

The multiplier 167 multiplies the change rate dV* of the voltage command V* outputted from the differentiator 161 by the dead time compensation voltage ΔV outputted from the gain calculator 163 by the polarity A outputted from the polarity determination unit 165, thus calculating a final dead time compensation voltage ΔV' as A×dV*×ΔV.

The adder 169 adds the final dead time compensation voltage ΔV' to the voltage command V*, thus calculating a final voltage command value VFL*.

The final voltage command value produced by the electric power converter according to this embodiment will be described below with reference to FIGS. 5 and 6.

Figure 5:
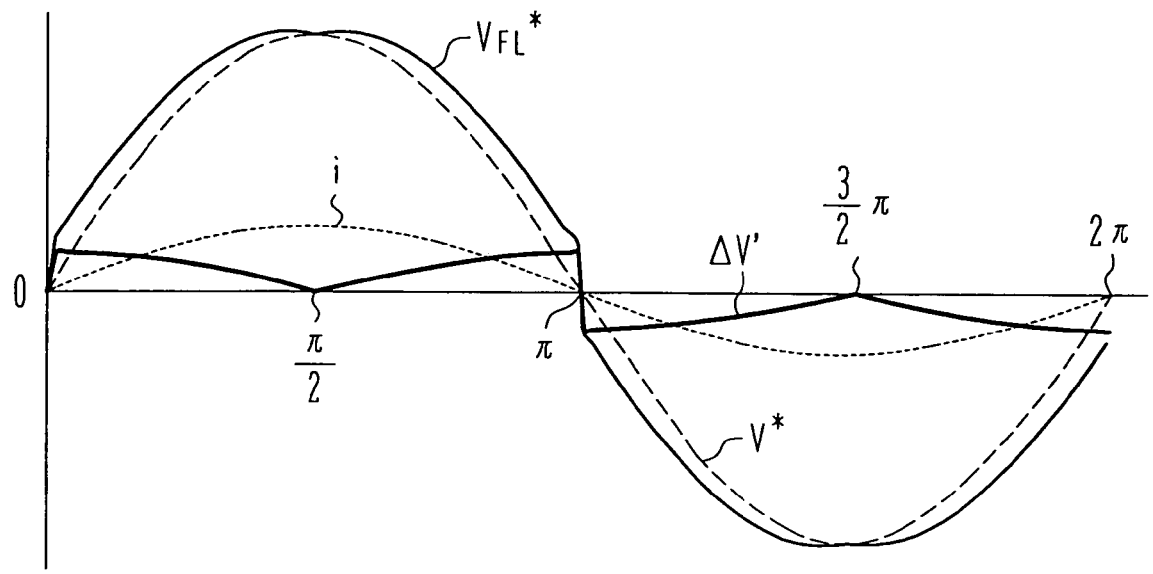
FIG. 5 is a chart showing the waveform of a final voltage command value produced by the electric power converter according to the one embodiment of the present invention when the power factor is 1.

FIG. 5 is a chart showing the waveform of the final voltage command value produced by the electric power converter according to the one embodiment of the present invention when the power factor is 1. FIG. 6 is a chart showing the waveform of the final voltage command value produced by the electric power converter according to the one embodiment of the present invention when the power factor is other than 1. FIGS. 5 and 6 each show a phase range of 0-2π. The value of voltage command V* is 0 at the phase 0, π and 2π.

As shown in FIG. 5, when the power factor is 1, the value of voltage command V* is 0 at the phase 0, π and 2π, and is changed in the form of a sine wave in the ranges between those phases, as indicated by a dotted line. Also, as indicated by a dotted line, the motor current i is 0 at the phase 0, π and 2π, and is changed in the form of a sine wave in the ranges between those phases.

Because the final dead time compensation voltage ΔV', indicated by a solid line, is calculated from the differentiated value of the voltage command V* as described above with reference to FIG. 4, it necessarily becomes 0 at each peak of the voltage command V*. In other words, the final dead time compensation voltage ΔV' is 0 at the phase π/2 and 3π/2. Further, on both sides of each phase π/2 and 3π/2, the final dead time compensation voltage ΔV' has a value larger than 0 when the value of the voltage command V* is positive, and it has a value smaller than 0 when the value of the voltage command V* is negative. Because the final voltage command value VFL* is obtained by adding the voltage command V* and the final dead time compensation voltage ΔV', the final voltage command value VFL* takes a maximum value approximately at the phase π/2 on both sides thereof and a minimum value approximately at the phase 3π/2 on both sides thereof.

Figure 6:
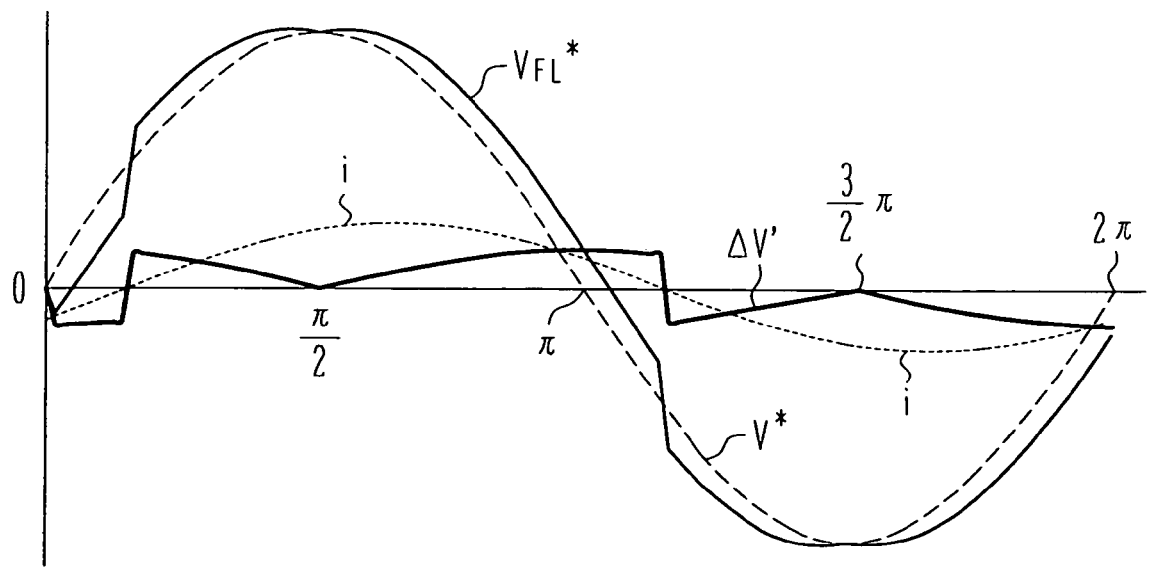
FIG. 6 is a chart showing the waveform of the final voltage command value produced by the electric power converter according to the one embodiment of the present invention when the power factor is other than 1.

As shown in FIG. 6, when the power factor is other than 1, the value of the voltage command V* is 0 at the phase 0, π and 2π, and is changed in the form of a sine wave in the ranges between those phases, as indicated by a dotted line. The motor current i is changed in the form of a sine wave with a phase shift relative to the voltage command V*.

Similarly to the above case, because the final dead time compensation voltage ΔV', indicated by a solid line, is calculated from the differentiated value of the voltage command V* as described above with reference to FIG. 4, it necessarily becomes 0 at each peak of the voltage command V*. In other words, the final dead time compensation voltage ΔV' is 0 at the phase π/2 and 3π/2. Further, on both sides of each phase π/2 and 3π/2, the final dead time compensation voltage ΔV' has a value larger than 0 when the value of the voltage command V* is positive, and it has a value smaller than 0 when the value of the voltage command V* is negative. Because the final voltage command value VFL* is obtained by adding the voltage command V* and the final dead time compensation voltage ΔV', the final voltage command value VFL* takes a maximum value approximately at the phase π/2 on both sides thereof and a minimum value approximately at the phase 3π/2 on both sides thereof.

Thus, regardless of the value of the power factor, the final voltage command value VFL* takes a maximum value approximately at the phase π/2 on both sides thereof and a minimum value approximately at the phase 3π/2 on both sides thereof.

With the known method disclosed in JP-A-5-64457, since a constant ineffective voltage value is used as the compensation voltage value, the compensation error is increased. In contrast, with this embodiment, since the dead time compensation voltage is calculated using the differentiated value dV* of the voltage command V*, the compensation error can be reduced.

Also, with the known method disclosed in JP-A-5-64457, in spite of the fact that in the high-speed rotation range of the AC electric motor, i.e., in the range where the power factor is other than 1, a phase difference occurs between the output voltage and current and the polarity of the dead time is opposed to that of the current, such a point is not compensated. In contrast, with this embodiment, since the polarity A of the dead time compensation voltage is changed depending on the polarity of the current i, the dead time compensation can be performed depending on the polarity of the current and the compensation error can be reduced.

Further, with the known method disclosed in JP-A-2002-218794, the process of estimating the resistance increases the load factor of CPU. In contrast, with this embodiment, since the final dead time compensation voltage ΔV' is calculated, as described above with reference to FIG. 4, based on the voltage command V*, the switching frequency fc, the dead time Td, the DC power-supply voltage value Vdc, and the current i and the process of estimating the resistance is not executed, the load factor of CPU can be reduced.

Moreover, the known method disclosed in JP-A-2002-218794 accompanies with the problem that the impedance of the motor is changed depending on the rotation speed. In contrast, with this embodiment, since the impedance of the motor is not used, the compensation error can be reduced.

In the above description, the dead time compensation voltage (gain value) $\Delta V$ is calculated based on the switching frequency fc, the dead time Td, and the DC power-supply voltage value Vdc. However, if the DC power-supply voltage value Vdc and the switching frequency fc are constant over the entire operating range of the motor, the gain value can be set constant by setting the dead time Td to a constant value. As a result, a processing load in the control circuit can be reduced.

Additionally, the present invention is applicable to not only an electric or hybrid vehicle, but also to any kinds of equipment including a combination of an electric power converter and an AC electric motor.

According to this embodiment, as described above, it is possible to reduce a current ripple and a torque variation caused due to the dead time set in a DC-AC converter (inverter) which is mounted in an electric vehicle, etc.

What is claimed is:

1. An electric power converter comprising:
   a power module including a plurality of switching devices connected in series and converting DC power to AC power; and
   control means for producing a voltage command value in accordance with a control command inputted from the exterior, and producing gate signals to drive the switching devices of said power module corresponding to a final voltage command value which is obtained from the voltage command value with dead time compensation,
   said control means including dead time compensation means for producing the final voltage command value which takes a maximum value approximately at a phase $\pi/2$ of the voltage command value on both sides thereof and a minimum value approximately at a phase $3\pi/2$ of the voltage command value on both sides thereof.

2. The electric power converter according to claim 1, wherein said dead time compensation means sets a dead time compensation voltage to 0 at the phase $\pi/2$ and the phase $3\pi/2$ of the voltage command value.

3. The electric power converter according to claim 2, wherein said dead time compensation means calculates the dead time compensation voltage based on a change rate of the voltage command value and a polarity of a current, and calculates the final voltage command value by adding the calculated dead time compensation voltage to the voltage command value.

4. The electric power converter according to claim 3, wherein said dead time compensation means calculates a gain based on a DC voltage value supplied to said electric power converter, a dead time and a switching frequency, and sets, as an absolute value of the dead time compensation voltage, an absolute value of the product obtained by multiplying the calculated gain by a differentiated value of the voltage command value.

5. A motor driving system comprising an electric power converter for converting DC power to AC power, and an AC motor driven with supply of the AC power converted by said electric power converter, said electric power converter comprising:
   a power module including a plurality of switching devices connected in series and converting DC power to AC power; and
   control means for producing a voltage command value in accordance with a control command inputted from the exterior, and producing gate signals to drive the switching devices of said power module corresponding to a final voltage command value which is obtained from the voltage command value with dead time compensation,
   said control means including dead time compensation means for producing the final voltage command value which takes a maximum value approximately at a phase $\pi/2$ of the voltage command value on both sides thereof and a minimum value approximately at a phase $3\pi/2$ of the voltage command value on both sides thereof.

6. The electric power converter according to claim 1, wherein the final voltage command value is calculated based on the voltage command and a final dead time compensation voltage, and
said dead time compensation means changes a polarity of the dead time compensation voltage depending on a polarity of AC current outputted from said power module.

7. An electric power converter comprising:
   a power module including a plurality of switching devices connected in series and converting DC power to AC power; and
   control means for producing a voltage command value in accordance with a control command inputted from the exterior, and producing gate signals to drive the switching devices of said power module corresponding to a final voltage command value which is obtained from the voltage command value and a dead time compensation value,
   wherein the dead time compensation value is set so that the dead time compensation value decreases gradually when the voltage command value increases, and the dead time compensation value increases gradually when the voltage command value decreases; and
   wherein said dead time compensation means sets a dead time compensation voltage to 0 at the phase $\pi/2$ and the phase $3\pi/2$ of the voltage command value.

* * * * *